No. 871,115. PATENTED NOV. 19, 1907.
M. M. EDWARDS.
COTTON SEED SEPARATOR.
APPLICATION FILED SEPT. 15, 1906.
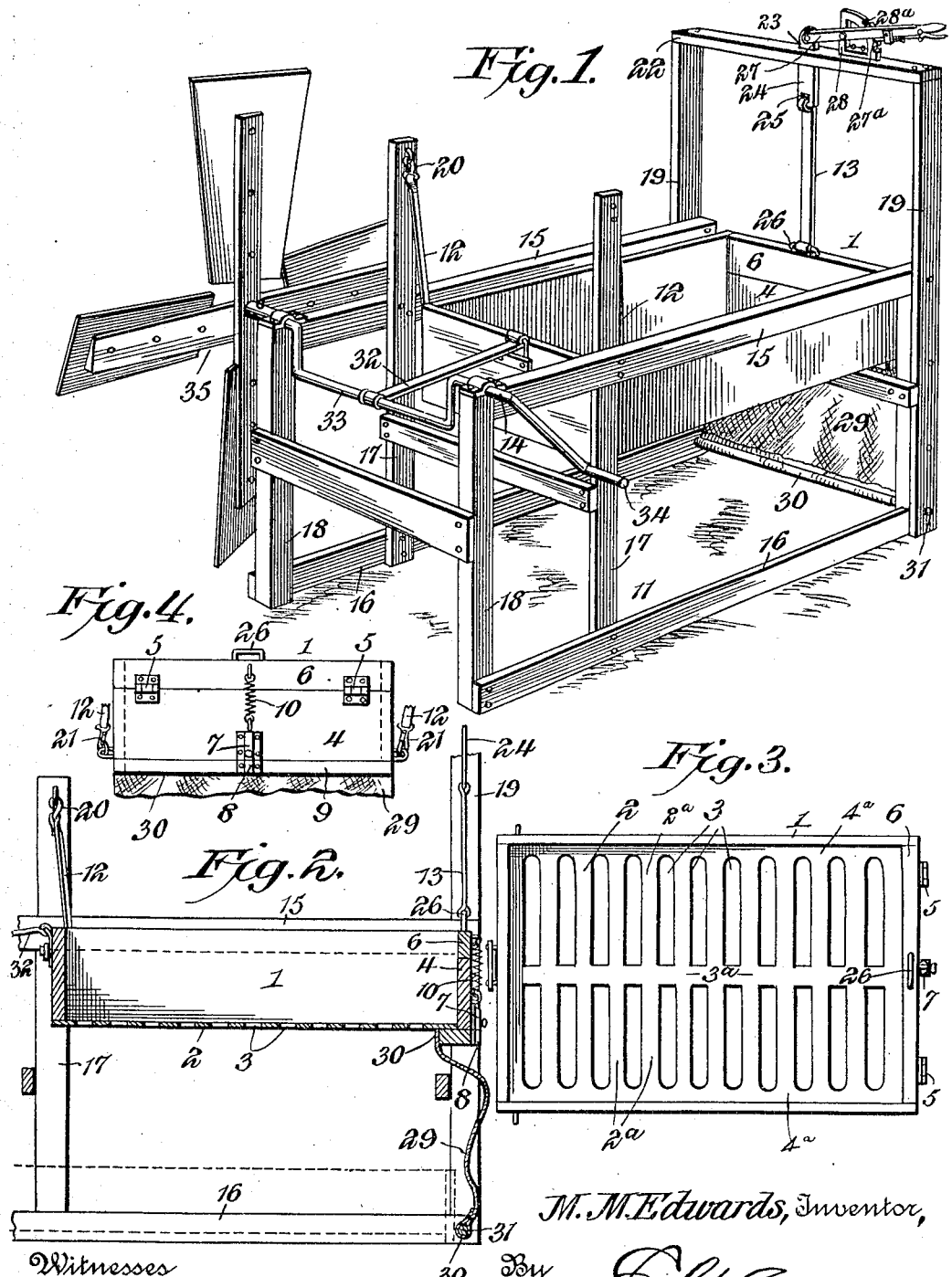
M. M. Edwards, Inventor,
Witnesses
Howard D. Orr.
H. F. Riley.
By E. G. Siggers
Attorney

UNITED STATES PATENT OFFICE.

MONTIEVILLE M. EDWARDS, OF ABBOTT, TEXAS.

COTTON-SEED SEPARATOR.

No. 871,115.          Specification of Letters Patent.          Patented Nov. 19, 1907.

Application filed September 15, 1906. Serial No. 334,731.

*To all whom it may concern:*

Be it known that I, MONTIEVILLE M. EDWARDS, a citizen of the United States, residing at Abbott, in the county of Hill and State of Texas, have invented a new and useful Cotton-Seed Separator, of which the following is a specification.

The invention relates to a cotton seed separator.

The object of the present invention is to improve the construction of sifting machines, and to provide a simple, inexpensive and efficient machine adapted for sifting and separating cotton seed to enable the large and small seed to be sold or otherwise disposed of separately, whereby the value of the seed is greatly enhanced.

A further object of the invention is to provide a cotton seed sifting machine, adapted to be operated by the wind, and capable of being readily moved from one place to another, so as to be operated in doors by hand or other power, when the weather is not suitable for operating the machine out doors.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a perspective view of a cotton seed separator, constructed in accordance with this invention. Fig. 2 is a longitudinal sectional view of the same. Fig. 3 is a plan view of the sifter. Fig. 4 is an end view of the same.

Like numerals of reference designate corresponding parts in all the figures of the drawing.

1 designates a vibratory sifter of oblong form, composed of side and end walls and a bottom or sieve 2, which is preferably constructed of suitable sheet metal, and which is provided at opposite sides of the median line with transversely disposed parallel openings 3. The openings 3, which are oblong, are of a size to permit the small cotton seed to pass through the sieve, which is adapted to retain the large cotton seed within the sifter. These narrow slots or openings 3 extend substantially across the side portions of the sieve, but terminate short of the median line and the side walls of the sieve, and they form intervening transverse slats $2^a$ and longitudinally disposed central and side connecting portions $3^a$ and $4^a$, which have their upper faces arranged in the same plane to enable the sifter to present a smooth upper face to the material, so as not to interfere with the free passage of the same over the sieve. The sides and end wall may be constructed of any suitable material, and the sifter is provided at its rear end with an end gate 4, connected at the top by hinges 5 with a transverse end bar or section 6 and provided at its lower edge with a suitable catch or latch 7, having a spring actuated bolt for engaging a keeper 8 of a transverse bottom bar or piece 9, whereby the end gate is locked in its closed position. When the end gate is unlatched, it is automatically opened by means of a coiled spring 10, arranged on the exterior of the sifter and connected with the end gate and with the upper transverse bar or section 6. The coiled spring 10 is placed under tension by closing the end gate, and it automatically swings the latter upwardly when the same is free to move. The gate is opened to enable the sifted seed either to run out or to be shaken out by the vibration of the sifter.

The sifter is suspended within a frame 11 by means of front side links 12 and a centrally arranged rear link 13, and it is vibrated by a crank shaft 14. The frame 11 is provided with top and bottom side bars 15 and 16 and it has intermediate and end posts or uprights 17, 18, and 19, which are secured to the side bars, and which are connected by suitable cross bars or pieces. The intermediate posts or uprights 17 and the end posts or uprights 19 are extended above the top side bars 15 to form supports for the oscillatory links 12 and 13. The links 12 preferably consist of leather straps, provided with upper and lower snap hooks 20 and 21, which are linked into suitable eyes of the posts or uprights 17 and the sides of the sifter. The end posts or uprights 19 are connected at their upper terminals by a top transverse bar 22, provided with a central slot 23, in which is arranged a plate or member 24. The link 13, which is preferably constructed of metal, is provided at its ends with eyes, which are linked into an eye 25 of the plate or member 24 and an eye 26 of the rear end of the sifter. The plate or member 24, which is vertically adjustable, is connected at its upper end to an adjusting lever 27, fulcrumed at an intermediate point on a bracket 28 and adapted to be oscillated to raise and lower the plate or member 24. The bracket is provided with a toothed segment $28^a$, which is engaged by a spring actuated dog or detent $27^a$ of the lever, whereby the latter is locked at any adjustment. The plate 24 is adapted to be adjusted to arrange the sifter in the proper position for effective sifting, and it is capable of lowering the rear end of the sifter, so that the vibratory motion of the latter will operate to eject or discharge the sifted seed into a suitable receptacle.

A suitable receptacle may be placed beneath the sifter to receive the small cotton seed, and in order to prevent the seed from mixing when emptying the sifter, a flexible transverse shield 29 of suitable fabric is arranged at the rear end of the machine, being secured at its upper edge 30 to the sifter at the bottom thereof and connected at its lower edge with the bottom of the frame 11. The lower edge of the shield may be fixed in any suitable manner, and as shown in Figs. 1 and 2 of the drawing, the lower edge of the screen 29 is provided with a casing or hem $30^a$, in which is arranged a transverse rung or bar 31 of the frame 11.

The front end of the sifter is connected by a rod or bar 32 with a crank bend 33 of the shaft 14, which is journaled in suitable bearings of the sides of the frame and which, when rotated, vibrates the sifter. The shaft is provided at one end with a crank handle 34, and a wind-wheel 35 is detachably secured to the other end of the shaft. The machine is designed particularly for use out doors and is placed facing the wind, so that the wind-wheel will operate the machine, but the latter may be operated in doors by hand or by any other suitable means.

Having thus fully described my invention, what I claim as new and desire to secure by Letters Patent, is:—

1. In a machine of the class described, the combination of a frame having spaced sides and provided at the bottom with a transverse member located at the rear end of the machine, a vibratory sifter having front and side walls and provided with a rear end gate hinged at the top and arranged to open at the bottom, a flexible transverse shield extending across the rear end of the frame and secured at its lower free edge to the said transverse member and connected at its upper edge with the bottom of the sifter adjacent to the lower edge of the end gate, an adjusting lever disposed transversely of the frame and connected with the rear end of the sifter adjacent to the hinged edge of the end gate for raising and lowering the said sifter, and means for securing the lever in its adjustment.

2. In a machine of the class described, the combination of a vibratory sifter provided at one end with an end gate hinged at the top and provided at the bottom with a fastening device, and a coiled spring connected with the end gate for automatically opening the same when the said end gate is free to swing upwardly.

3. In a machine of the class described, the combination of a frame, a vibratory body, operating mechanism connected with one end of the body for actuating the same, a vertically adjustable plate or member connected with the other end of the body, an adjusting lever mounted on the frame and connected with the plate or member for raising and lowering the same, and means for securing the lever in its adjustment.

In testimony, that I claim the foregoing as my own, I have hereto affixed my signature in the presence of two witnesses.

MONTIEVILLE M. EDWARDS.

Witnesses:
W. D. ELLIOTT,
J. A. WEST.